N. J. PETERSON.
FOLDING BOX.
APPLICATION FILED SEPT. 11, 1912.

1,097,260.

Patented May 19, 1914.

2 SHEETS—SHEET 1.

Witnesses.
H. L. Opsahl.
E. C. Skinkle.

Inventor
N. J. Peterson
By his Attorneys
Williamson Merchant

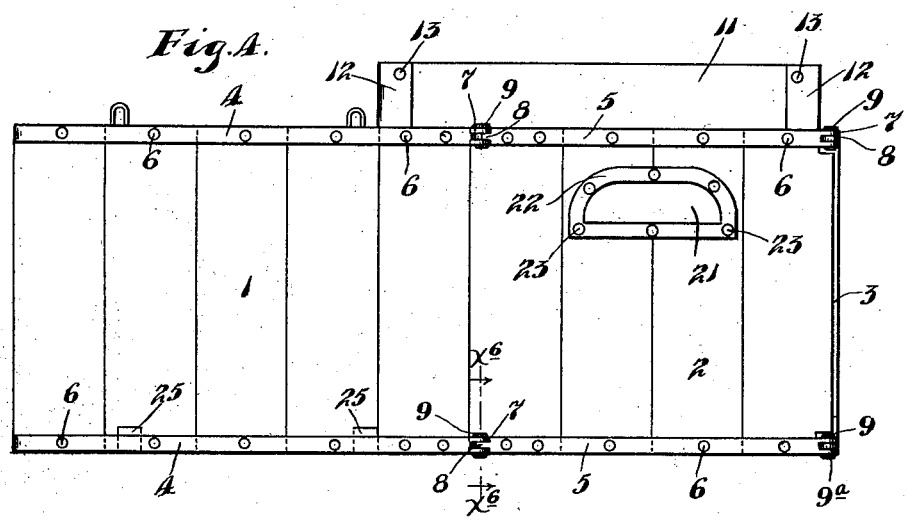

UNITED STATES PATENT OFFICE.

NIELS JULIUS PETERSON, OF MINNEAPOLIS, MINNESOTA, ASSIGNOR OF ONE-THIRD TO ALBERT PETERSON, OF MINNEAPOLIS, MINNESOTA.

FOLDING BOX.

1,097,260.     Specification of Letters Patent.     Patented May 19, 1914.

Application filed September 11, 1912. Serial No. 719,708.

*To all whom it may concern:*

Be it known that I, NIELS JULIUS PETERSON, a citizen of the United States, residing at Minneapolis, in the county of Hennepin and State of Minnesota, have invented certain new and useful Imrovements in Folding Boxes; and I do hereby declare the following to be a full, clear, and exact description of the invention, such as will enable others skilled in the art to which it appertains to make and use the same.

My invention has for its object to provide an improved knock-down or folding box, especially adapted for use in delivering groceries, and other articles which are either put up in small packages or are to be delivered in loose bulk. The improved box has been particularly designed and constructed to withstand rough usage, such as dragging the box over cement floors or throwing the same onto the sides of delivery wagons.

To the above ends, generally stated, the invention consists of the novel devices and combination of devices hereinafter described and defined in the claims.

The invention is illustrated in the accompanying drawings, wherein like characters indicate like parts, throughout the several views.

Figure 1:
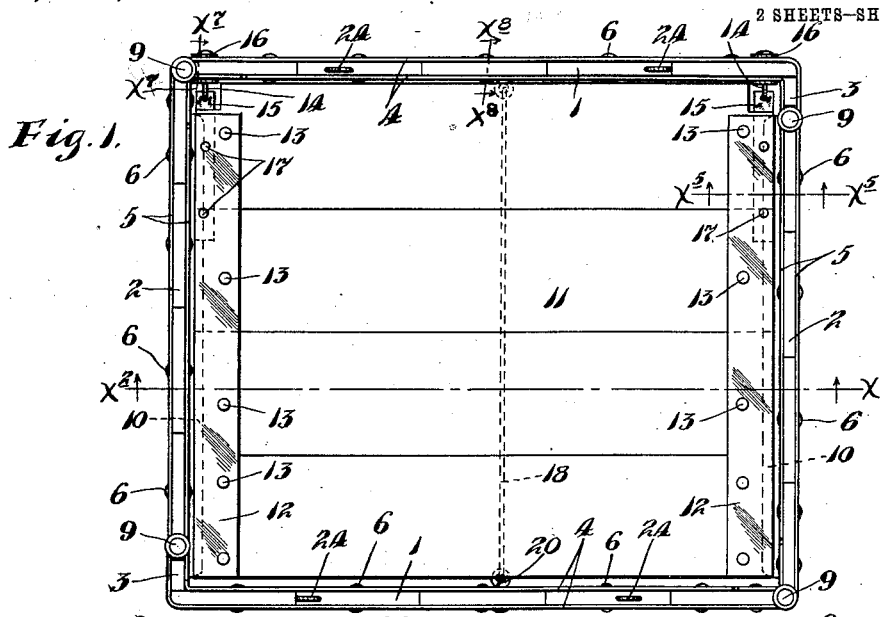
Figure 2:
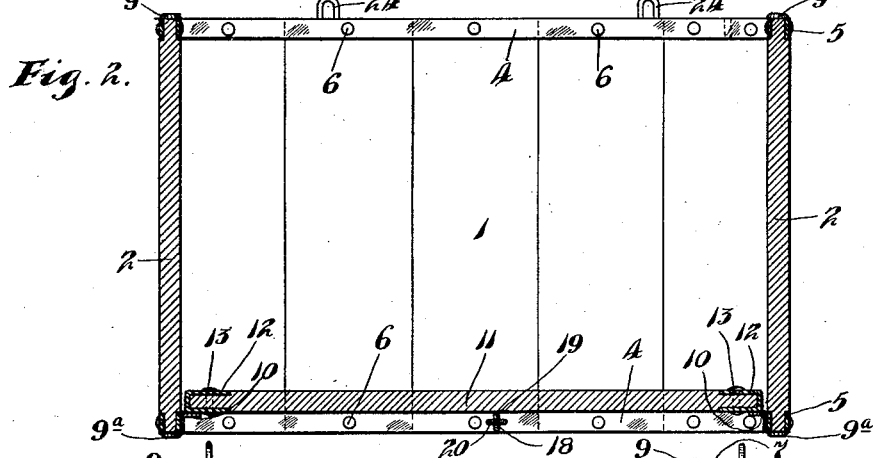
Figure 3:
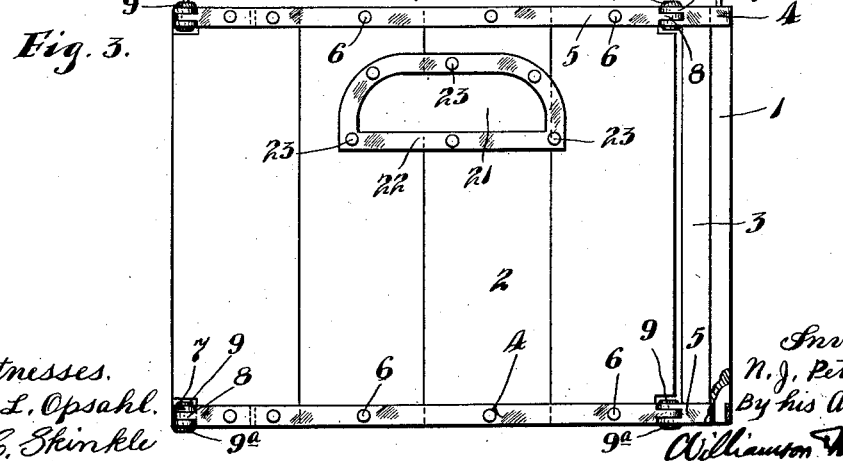

Referring to the drawings: Figure 1 is a plan view of my improved knock-down box, set up in position for use; Fig. 2 is a vertical section taken on the line $x^2$ $x^2$ of Fig. 1; Fig. 3 is an end elevation of the improved knock-down box, as shown in Fig. 1; Fig. 4 is a view in side elevation of the box shown in as knocked down, or with the parts in their completely folded positions; Fig. 5 is a detail view in section, on an enlarged scale, taken on the line $x^5$ $x^5$ of Fig. 1; Fig. 6 is a detail view in section, on an enlarged scale, taken on the line $x^6$ $x^6$ of Fig. 4; Fig. 7 is a detail view partly in section, on an enlarged scale, taken on the line $x^7$ $x^7$ of Fig. 1 and partly in elevation; and Fig. 8 is a detail view, on an enlarged scale, partly in section, taken on the line $x^8$ $x^8$ of Fig. 1, and partly in side elevation.

The numeral 1 indicates the side walls and the numeral 2 the end walls of the improved box. At the diagonal, opposite corners of the box, the sides 1 are provided with end ribs or flanges 3, which are turned at right angles to the sides 1. These flanges 3 are rigidly connected to the adjacent edges of the end pieces 2, and the outer edges of the end pieces 2 are connected to the adjacent edges of the side pieces 1 by means of hinges that will presently be described. As shown, the sides 1 and the ends 2 are formed from a multiplicity of comparatively narrow, upright staves. The staves forming the sides 1 are secured together at their extreme upper and lower edge portions by metal reinforcing bands 4. And the staves forming the ends 2 are also secured together at their extreme upper and lower edge portions by metal reinforcing bands 5. Each of these bands 4 and 5 is formed from a single metallic strap, bent upon itself, in a manner to extend completely around that portion of the sides or ends to which it is applied. As shown, these reinforcing bands 4 and 5 are set into the staves so that their outer faces are flush therewith, and they are rigidly secured to and clamped onto the staves by rivets 6. In some instances, when the staves are quite thin, the inner portions of the bands 4 and 5 may be set into the staves so as to make the inner surface of the box smooth, and the outer portions of the said bands are secured on the outer surfaces of the staves, without reducing the same.

Each of the reinforcing bands 4, at the two points where the same is bent around the upright edge portions of the sides 1, is cut away at its intermediate portion to form a pair of hinge knuckles 7, as best shown in Figs. 3 and 4. And each of the reinforcing bands 5, at the two places where the same is bent around the upright edge portions of the sides 2, is cut away at its upper and lower edge portions, to form a single hinge knuckle 8. These hinge knuckles 8 are adapted to be inserted between the hinge knuckles 7 and are connected thereto, to complete the hinges, by large rivets, forming hinge pins 9, as best shown in Fig. 6.

By reference to the drawings, it will be noted that the head ends of the large rivets forming the hinge pins 9, of the lower or bottom set of hinges, are turned upside down and are extended below the lower edges of the reinforcing bands 4 and 5 to afford supporting feet 9ª for the box. Obviously, the supporting feet 9ª take all of the wear, resulting from the dragging of the box over cement floors and the like, that would otherwise come on the lower edges of the walls of the box. It is also obvious that the reinforcing bands 4 and 5 thoroughly protect the upper and lower ends of the staves against wear and breakage, resulting from throwing the loaded boxes onto the sides of delivery vehicles, piling the same one upon the other, and the like. These bands 4 and 5 also act as rails to cause the box to freely slide over the sides of a delivery vehicle during the loading and unloading thereof.

The ends 2 are provided with stops 10, preferably formed from metallic angle strips, secured, one to each of the lower reinforcing bands 5. The horizontal flanges of these stops 10 project inward, in substantially the same horizontal plane with the upper edge of the reinforcing bands 5, and their vertical flanges are secured to the inner portions of the lower reinforcing bands 5 by rivets 6. To the inner and lower portion of one of the sides 1 is hinged a bottom plate 11. This bottom 11 is constructed from comparatively narrow staves, connected together, at their ends, by metallic channel pieces 12. These channel pieces 12 are permanently secured to the bottom 11 by rivets 13. Each of the two hinges, which connect the bottom 11 to one of the sides 1, comprises an eye-bolt 14, the eye of which is interlocked with an eye formed in a flat metal strip 15. The bodies of the eye-bolts 14 are passed through one of the sides 1, and also through a pair of washers 16, located on opposite faces of said side 1, and they are secured in this position by upsetting the free ends thereof. As shown in Fig. 1, the metal hinge strips 15 are set in longitudinally extended grooves, cut in the ends of the staves of the bottom 11, and are secured therein by rivets or pins 17, passed through the said staves and holes punched in the strips 15. Preferably these metal hinge strips 15 extend the full width of the bottom 11, to reinforce the same. For reinforcing the box and adding an extra support for the bottom 11, a long rod 18, terminating at its ends in eyes 19, extends transversely under the intermediate portion of the bottom 11, and is secured to the sides 1 by eye-bolts 20, having their bodies passed through the lower pair of reinforcing bands 5, and secured thereto by upsetting the free end thereof.

Cut in the ends 2 is a pair of hand holes 21, and surrounding each thereof is a pair of reinforcing metallic bands 22. These bands 22 are located, one on each face of the staves of the ends 2, and are rigidly secured and clamped thereon by rivets 23.

The improved box is provided, at its two sides 1, with dowels 24 and dowel seats 25. As best shown in Figs. 1 and 2, the dowels 24 are preferably in the form of staples, driven in the upper edges of the staves forming the sides 1, and the dowel seats 25 are formed by cutting away a portion of the staves of the sides 1 at their lower ends, between the reinforcing bands 5. This adaptes the boxes to be piled one on top of the other, and held there simply by placing the dowel seats 25 of a given box over the dowels 24 of the box which is beneath the same.

When the sides and ends of the box are moved into the form of a rectangle, the bottom 11 will drop against the stops 10 and the supporting rod 18, and will brace and hold the box in its set-up position. When it is desired to fold the box, as shown in Fig. 4, the bottom 11 is first turned up against the side 1 to which it is hinged. Then, by pressing on the sides of the box, it will assume its folded position.

By the employment of the reinforcing bands 4 and 5, it is also possible to use veneer staves in place of boards, thereby materially reducing the cost of the construction of the box. In this case, the bands 4 and 5 are clamped to the opposite faces of the veneer and secured thereto by rivets, without setting the same into the wood.

The above described folding box, while extremely simple and of comparatively small cost to manufacture, has, in actual usage, been found highly efficient for the purpose had in view.

What I claim is:

1. A folding box comprising walls constructed from a plurality of upright staves, a bottom, metallic reinforcing straps completely encircling and secured to the upper and lower ends of said staves, hinge knuckles formed by reducing said straps at points where they are bent upon themselves around the vertical edges of said walls, and hinge pins connecting said hinge knuckles, to permit a toggle-joint folding action of said walls.

2. A folding box comprising walls, a bottom, metallic reinforcing straps completely encircling the upper and lower edges of said walls, hinges connecting said walls, to permit a toggle-joint folding action thereof, dowels secured to the upper edges of said walls, between their said metallic reinforcing straps, and dowel seats formed in the lower edges of said walls between their said metallic straps, adapting the boxes to be stacked one upon the other.

3. A folding box comprising walls, hinges connecting said walls for toggle-joint folding action, a folding bottom, metallic straps seated and secured in longitudinally extended grooves cut in opposite edges of said bottom, hinges connecting one of the ends of said straps to one of the walls of said box, permitting said bottom to be folded inward, and channel-shaped metallic reinforcing pieces, embracing and secured to the edges of said bottom, to which said straps are secured.

In testimony whereof I affix my signature in presence of two witnesses.

NIELS JULIUS PETERSON.

Witnesses:
EDITH HANNA,
HARRY D. KILGORE.

Copies of this patent may be obtained for five cents each, by addressing the "Commissioner of Patents, Washington, D. C."